Patented Dec. 26, 1933

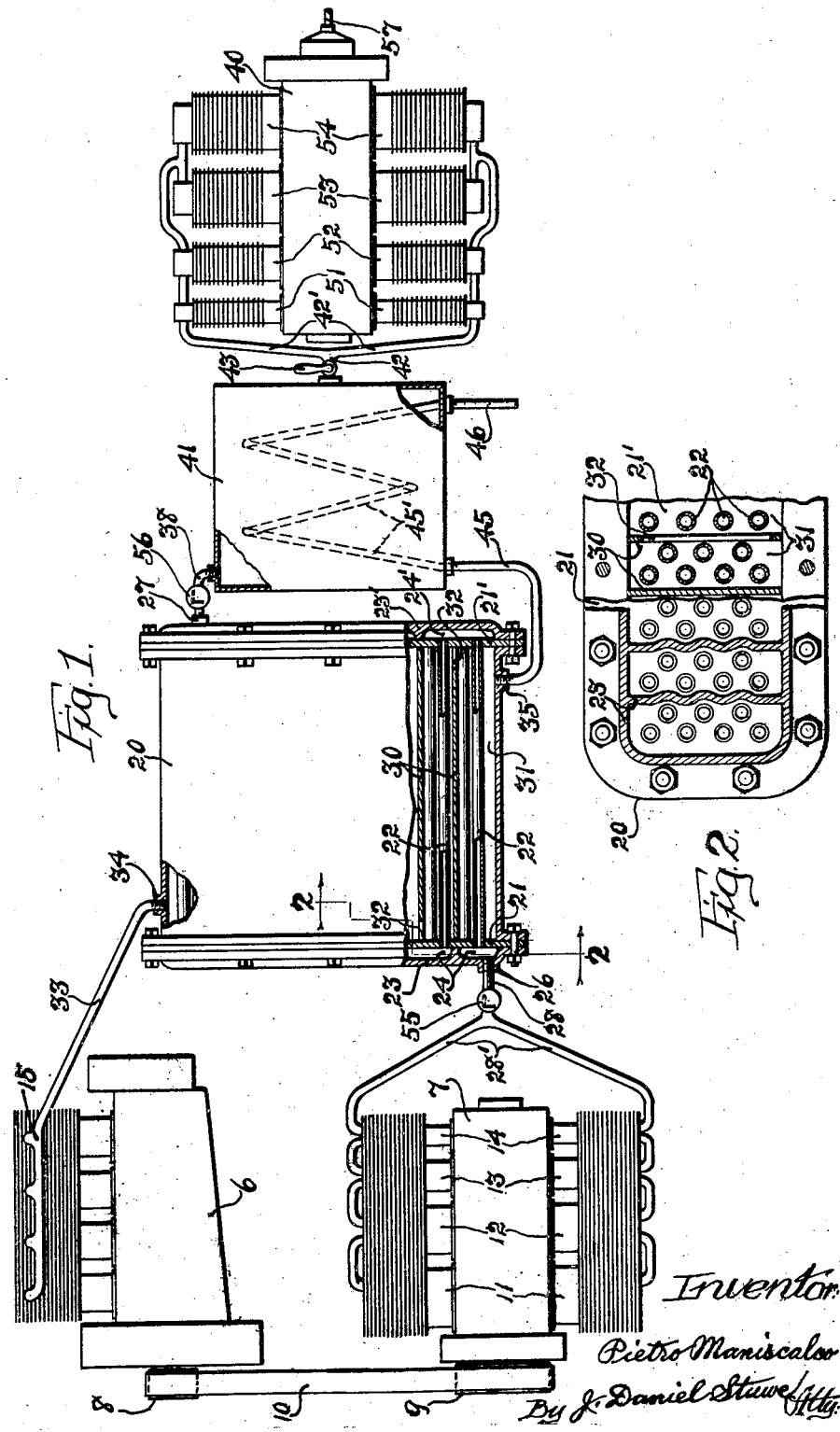

1,940,960

UNITED STATES PATENT OFFICE 1,940,960

COMPRESSED AIR POWER UNIT

Pietro Maniscalco, Chicago, Ill.

Application June 29, 1932. Serial No. 619,929

1 Claim. (Cl. 60—14)

This invention relates to a compressed air power unit.

The main object of this invention is to provide a power unit which will produce a maximum of economy in the consumption of fuel; and which is also very reliable in its application of power and will provide continuous operation even if the prime mover ceases to function.

Another object is to provide a compressed air power unit which embodies all the desirable features of the steam engine, such as overload capacity, reliability and especially non-stallability; and which also embodies the desirable features of the present day gasoline engine, such as light weight, and which can be instantly started and instantly stopped.

These and various other objects and advantages will become apparent from the following description, taken in connection with the accompanying drawing, in which the invention is illustrated in its preferred form of construction, it being understood that various other arrangements and forms of construction may be resorted to for carrying out the objects and purposes of this invention.

In the drawing:

Fig. 1 is a view chiefly diagrammatic illustrating my compressed air power unit in its preferred form.

Fig. 2 is a sectional view on line 2—2 of Fig. 1, of my novel means for heating the compressed air before it is delivered to the air motor.

This invention briefly comprises a prime mover, such as a gasoline engine, directly connected to an air compressor for driving it, which, in turn, supplies the compressed air to an air motor for doing work thereby; while heating means is also provided to heat the compressed air in its transit to the motor. The combined output of energy of this power unit is then utilized for driving a machine, such as a stationary engine, an automobile, an airplane, a locomotive, and the like.

As illustrated in the drawing the disclosed form of my invention comprises a prime mover 6 which is preferably in the form of a gasoline engine or similar internal combustion engine, for which a four cylinder, two cycle gasoline engine is well adapted. Said engine 6 is directly connected to an air compressor 7 for driving the same, as by means of pulleys 8 and 9 provided, respectively, on the operating shafts of said engine and said compressor; said pulleys being connected by a belt 10.

The compressor consists of a multistage compressor, preferably a four-stage compressor of the reciprocating piston type, as indicated in the drawing by the cylinders 11, 12, 13 and 14, which gradually decrease in size to increase their compressing force upon the air compressed therein, said compressor being thus capable of producing pressures of 2,500 to 3,000 pounds per square inch, and even higher.

The compressed air is then heated to a very high temperature, for which purpose the exhaust gases rejected from the exhaust manifold 15 of the gasoline engine 6 are utilized, so as to increase the energy in the compressed air above the amount it contained when leaving the air compressor. The means for heating the air preferably includes a heating member 20 in the form of a casing having perforated end-plates 21 and 21' thereon, and a plurality of conduits in the form of pipes 22 extending from end-plate to end-plate, and being mounted in the perforations therein. Caps 23 and 23' are mounted on the outside of the end-plates 21 and 21' and have arched channel portions 24 and 24' formed therein, each of which operatively connect two sets of pipes 22, so as to conduct the air to and fro through casing 20, from the inlet port 26 at one end, through the successive sets of pipes and channel portions, to the outlet port 27 at the opposite end, the compressed air being delivered to said port 26 through a conduit 28 and its branch conduits 28' which are connected with the compressor. Partition walls or baffle plates 30 extend from end-plate to end-plate through the casing, forming a series of chambers 31, each containing a plurality or set of pipes 22 therein, and each plate has a slot 32 adjacent one end, said slots being provided alternately at the opposite ends of said plates. A conduit 33 conducts the hot exhaust gases from exhaust manifold 15 through inlet port 34 into the first chamber 31 of the series, whereby the hot gases from manifold 15 pass around pipes 22 in chambers 31, to and fro from inlet port 34 at one end of the casing to the outlet port 35 at the other end.

As the compressed air passes from conduit 26 into the channel in arched portion 24, and therefrom into the set of pipes 22, it expands, since they have a greater cross-section than the conduit. The hot exhaust gases are then conducted around the outside of the pipes 22, and in the reverse direction to the travel of the air through said pipes, whereby the compressed air is heated to a very high temperature by the time it travels from its inlet port 26, through the succession of sets of pipes 22, to the air outlet port 27, so as to greatly increase its pressure and working force by means of this heat exchanger 20.

An air motor 40 is driven by the compressed and heated air, which is transmitted from port 27 thereto through a delivery conduit 38, and it may be delivered by said conduit directly to the motor, or a reservoir may be interposed in the delivery conduit. It is preferred to install a tank or reservoir 41 in conduit 38, between heating member 20 and said motor, in order to provide a very smooth and elastic driving system, and to produce a factor of safety and reliability, whereby the compressed air from said reservoir may be utilized for an extended period of time for driving the motor in case the prime mover 6 stops or ceases to function properly. Said conduit 38 is herein connected to reservoir 41 to deliver the compressed air thereto; and a conduit 42, with a control valve 43 therein, delivers the compressed heated air through branches 42' to the air motor.

Heating means is preferably also provided for further heating the compressed hot air in the reservoir by means of said exhaust gases. This means preferably comprises a conduit 45 including several turns 45' mounted within reservoir 41, and receiving the exhaust gases from exhaust outlet 35 on casing 20, said conduit then expelling the exhaust gases through an outlet pipe 46 extending from the reservoir.

The air motor 40 consists of a multistage air engine, preferably of the reciprocating piston type, as indicated in the drawing by the varying sized cylinders 51, 52, 53 and 54. By manipulating control valve 43 the heated compressed air is selectively admitted, from the reservoir through conduit 42 and its branches 42' leading therefrom, to act on the cylinders of said motor; and the power is transmitted from the motor through its shaft 57, for utilizing the combined energy resulting from this power unit.

Check valves or one-way valves 55 and 56 are provided in the conduits 28 and 38, to prevent any return travel of the compressed air through said conduits.

This power unit provides an exceptionally elastic, even, and smooth power applying mechanism, which will not stall, but will continue to deliver power for a considerable length of time even after the gasoline engine has ceased to function, and which can be started and stopped at will. It finds application on movable bodies as well as on stationary mechanisms; and by the economical means employed for superheating the compressed air, the force thereof will be considerably increased; thereby also providing herewith considerable economy in the consumption of fuel. The several members of this power unit are furthermore so compactly arranged and combined that this unit is well adapted to be utilized for driving a movable body, as an automobile, an airplane, a locomotive, and the like.

I claim:

A compact power unit consisting of an internal combustion engine and an air compressor mounted alongside thereof, speed reducing means operatively connecting them for driving the compressor at reduced speed, a heat exchanger the head end of which is mounted adjacent said engine and compressor and including a series of interconnected chambers and a plurality of interconnected sets of pipes mounted therein, there being a set of pipes in each chamber, a conduit extending from the exhaust manifold of said engine to the adjacent part of the head end of said exchanger and leading into the inlet end of said chambers to conduct the exhaust gases therethrough, conduit means extending from the compressor to the adjacent part of the head end of said exchanger and leading into the inlet part of said pipes for conducting the compressed air therethrough, a reservoir mounted at the far end of said heat exchanger and connected with the outlet part of said pipes, heating means mounted in said reservoir, a conduit leading from the outlet part of said chambers for conducting the exhaust gases therefrom through said heating means, to further utilize the exhaust gases for heating the compressed air in said reservoir, and a multistage air motor of the reciprocating piston type and valve controlled conduit means for connecting it with said reservoir to be actuated by said compressed and heated air, whereby to apply the combined energies of the power unit through said motor.

PIETRO MANISCALCO.